United States Patent Office 2,744,883
Patented May 8, 1956

---

2,744,883

PREPARATION OF WATER SOLUBLE SALT OF N - DIALKYLAMINOALKOXYMETHYL POLYAMIDE

Irving P. Hammer, Belleville, and John B. Rust, East Hanover, N. J., assignors, by direct and mesne assignments, of one-half to Montclair Research Corporation, a corporation of New Jersey, and one-half to Ellis-Foster Company, a corporation of New Jersey No Drawing. Application March 17, 1949,
Serial No. 82,026

11 Claims. (Cl. 260—72)

This invention relates to water soluble polyamide derivatives and to intermediates convertible into such water soluble compounds, and to methods of making said intermediates and derivatives.

Polyamides of various types, such as the well known "nylon," have been known for some time, but their solubility has been restricted to rather caustic materials such as formic acid, phenol, etc., making them unavailable in solution for many purposes. Nor were such "nylon" type resins capable of emulsification in water. Lack of water solubility was a serious handicap in utilizing the compounds for many desirable purposes.

Among the objects of the present invention is the production of polyamides that are soluble in water and may therefore be employed in aqueous solution or emulsion for utilities not heretofore possible.

Further objects include the preparation of intermediates for the production of water soluble polyamides.

Still further objects and advantages of the present invention will appear from the more detailed description set forth below, it being understood that such more detailed description is given by way of illustration and explanation only, and not by way of limitation, since various changes may be made therein by those skilled in the art without departing from the scope and spirit of the present invention.

In accordance with the present invention, water soluble derivatives of polyamides, such as "nylon," or "nylon" type resins, are produced in the form of salts of N-disubstituted-N-alkoxy methyl polyamides, with carboxylic acids, such as fatty acids, and particularly the lower fatty acids. The nature of the substituent groups attached to nitrogen in the -N-alkoxy group has been found to have an important influence on the water solubility of the stated polyamides, and as a general rule such substituent groups in the disubstituted -N-alkoxy group should have less than six carbon atoms.

The water soluble derivatives of the present invention are readily produced from polyamides having hydrogen bearing carbonamide groups as an integral part of the main polymer chain, by reacting such polyamides with a formaldehyde yielding substance and an aminoalcohol, and conversion of the resulting modified polyamide into a salt of a carboxylic acid. The treatment of the polyamide with formaldehyde for example, and aminoalcohol, may be carried out in a solution of the polyamide in a fatty acid such as formic acid, which acid will form a salt with the aminoalcohol-formaldehyde-polyamide reaction product, and to insure water solubility of such salt, the amino alcohol used should be one which is sufficiently basic to react with the fatty acid specifically with formic acid. Such desired basicity in the aminoalcohol may be insured by the use of N-disubstituted aminoalcohols in which the substituent groups on the nitrogen are saturated aliphatic groups of less than six carbon atoms as for example alkyl groups below hexane, including methyl, ethyl, propyl, isopropyl, n-butyl, isobutyl, trimethyl methyl, and the various pentyl (amyl) groups, and such alkyl groups carrying substituent groups like hydroxy, which do not interfere with the desired water solubility. The stated water soluble salts are new entities in the art of great value since they may be used in solution in water or in aqueous emulsions. The salts per se may be recovered from the reaction medium in which they are produced by precipitation therefrom by means of an organic liquid capable of precipitating such salt from the solution in the form of a water soluble salt. The salt should not be neutralized as by addition of inorganic bases such as the caustic alkalis or ammonia, since such neutralization will destroy the water solubility of the modified polyamide.

The formation of the water soluble salt may take place by reaction of the polyamide in solution, as in formic acid, with formaldehyde and the aminoalcohol. The formaldehyde may first be reacted with the polyamide followed by reaction with the aminoalcohol, or these reactants namely polyamide, formaldehye and aminoalcohol may be reacted simultaneously in the presence of the acid, followed by precipitation of the salt by a convenient organic solvent, and the precipitated polymer is then readily soluble in water.

The following mechanism is believed to illustrate the formation of the water soluble salt, but is offered by way of explanation only without limitation thereto, since regardless of the explanation, water soluble salts are formed. The reactions probably involve the initial reaction between the formaldehyde and the amide nitrogen to form a methylol compound. The methylol group then condenses with the hydroxy group of the N-disubstituted aminoalcohol to form an ether link. When carried out in the presence of the acid, a salt of the alkylated amine group with such acid is formed. Upon precipitation with the organic solvent, this acid salt is deposited and is soluble in water. Assuming formic acid as the acid employed, the reactions may be formulated as follows:

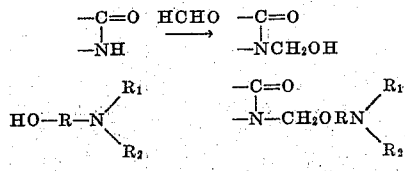

which forms the formic acid salt

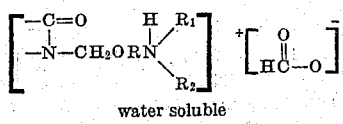

water soluble

The salt of the N-alkylated amine probably forms prior to etherification. In these formulas R is an alkylene while R₁ and R₂ are the N-disubstituent groups. While the illustrated mechanism is believed to be correct, it is not intended as limiting.

The polyamide employed may be any synthetic linear polyamide bearing recurring carbonamide groups as an integral part of the main polymer chain. The said recurring groups generally are separated by an average number of carbon atoms of at least 2. The number of such recurring groups which are modified and converted in the N-alkoxy methyl derivatives will vary with the proportions of the reactants used, but should be sufficient to yield water solubility of the salt ultimately prepared therefrom. For this purpose, generally the recurring groups will be at least 10% of the amide groups in the main polymer chain.

The polyamide employed may be of various types, for example, a polymethylene amide of a polymethylene dicarboxylic acid, or a poly ω-amino acid, or copolymers of these polyamides just mentioned, etc. Exemplary polyamides are polyhexamethylene adipamide, polyhexamethylene sebacamide, or polymers from epsilon-aminocaproic acid, including poly-epsilon-aminocaproic acid or poly epsilon caprolactam, copolymers such as that from ethylene diammonium sebacate and epsilon caprolactam, etc. Generally, the molecular weight of the polymers should be rather high, that is, those which have an intrinsic viscosity above 0.4.

As to the formaldehyde reactant, any formaldehyde-yielding material may be employed. Paraform is conveniently employed. 80% aqueous formaldehyde may be used. The amount of formaldehyde is desirably from 0.5 to 2.0 parts to one part of polyamide, dependent on the extent of reaction desired.

The N-disubstituted aminoalcohol should be one capable of neutralizing formic acid. Its general characteristics have been indicated above. As exemplary of such aminoalcohols there may be mentioned alkylolamines containing tertiary nitrogen, the alkylene group having for example from 1 to 4 and higher C chains. For example there may be mentioned dimethyl aminoethanol, diethyl amino ethanol, methyl diethanol amine, dimethyl isopropanolamine, triethanolamine, similar butanolamines, etc., and related compounds where the two substituents on the nitrogen may form a ring as in the morpholines such as hydroxyethylmorpholine. Certain disubstituted aminoalcohols such as phenyl diethanolamine, have a pH of about 7 (aqueous solution) and consequently are so weakly basic that they do not react sufficiently with formic acid. Therefore the "nylon" derivatives produced with such amines are either water insoluble on only very slightly water-soluble. Other amines in this category are ethylphenyl ethanolamine and di-2-ethyl hexyl ethanolamine. In general the molar ratio of aminoalcohol to formaldehyde will be the equimolar but may vary as from 3:1 to 1:2.

Formic acid has been particularly referred to as the reaction solvent. Other organic acids which are solvents for polyamides may be used, carboxylic acids such as formic, acetic, hydroxyacetic, and chloracetic, may be mentioned. Formic acid is desirably employed; and may be used in any concentration, such as 70% to 100%, in which it is a solvent for the polyamide used. Commercially available 90% formic acid may be employed conveniently. The temperature of reaction may be any temperature at which the stated reaction takes place, for example about 30° C., but should be below that at which undesired degradation of the polyamide takes place.

The organic liquid solvent employed for precipitation of the water-soluble salt may be of any convenient solvent which gives the precipitated polymer. Acetone may be used as well as other ketones such as methyl ethyl ketone, diethyl ketone, etc.

The following examples illustrate the invention, parts being by weight unless otherwise indicated.

*Example A*

10 parts of a poly ε-amino caproic acid which has an intrinsic viscosity in meta-cresol at 0.79 was dissolved in 87 parts of 90% formic acid at 60–70° C. in a reaction flask fitted with a thermometer, stirrer and air condenser. When dissolution had occurred the solution was cooled to 30° C. by external cooling. A solution of 10 parts of paraform in 29.3 parts of diethylamino ethanol was prepared by heating the mixture until solution of the paraform was effected. The paraformdiethylaminoethanol solution was cooled to 30° C. and added dropwise to the polyamide solution with rapid stirring. During the course of the addition, dense white fumes were evolved; white salt-like particles were formed in the reaction mixture; and the temperature rose rapidly. The reaction temperature was maintained at 35–40° C. by means of a cold water bath until the dropwise addition was completed. Stirring was maintained and the reaction mixture which still contained salt-like particles, was heated to 60° C. and the reaction continued at that temperature until complete solution had occurred. The reaction was then continued at 60° C. for an additional ½ hour and then cooled to yield a pink fluid solution at room temperature.

45 parts of the above reaction product was treated with 158 parts of acetone with vigorous stirring to yield a faintly cloudy solution. The addition of 515 parts more acetone with constant stirring caused the precipitation of a fibrous precipitate. The mixture was allowed to stand for 10 minutes to allow the precipitate to harden and then filtered. The filtered precipitate, still wet with acetone and equivalent to 3.3 parts of poly ε-amino caproic acid, was easily soluble in 97 parts of water at room temperature. The rate of solution in water was appreciably faster at 50–60° C. The final solution obtained had a concentration of approximately 3.3% based on the poly ε-amino caproic acid.

*Example B*

10 parts of a polyhexamethylene adipamide, prepared from hexamethylene diammonium adipate, which had an intrinsic viscosity in meta-cresol of 0.47 was reacted with 87 parts of 90% formic acid, 10 parts paraform and 29.3 parts of diethylaminoethanol in the same manner as described in Example A. The reaction product was a deep red solution.

45 parts of the above solution was poured into 238 parts of acetone with vigorous stirring. A fibrous precipitate was formed which was filtered and washed with 39.5 parts of acetone. The acetone-wet precipitate, which contained the equivalent of 3.3 parts of polyhexamethylene adipamide, was dissolved in 95 parts of water at 40–50° C. with stirring. The aqueous solution was colored red.

*Example C*

10 parts of a commercial sample of polyhexamethylene adipamide which had an intrinsic viscosity in meta-cresol of 0.96 was reacted in the same fashion as described in Example A except that 137 parts of 90% formic acid was used instead of 87 parts.

57.1 parts of the final cooled reaction mixture (equivalent to 3.3 parts of the polyhexamethylene adipamide) was poured into 182 parts of acetone. A clear solution resulted. The addition of 365 parts of acetone to this solution caused the precipitation of a fibrous precipitate which was easily soluble in 97 parts of water at 60–70° C. to yield a 3.1% solution based on the original polymer.

*Example D*

10 parts of a copolymer prepared by heating 50 parts of ethylene diammonium sebacate and 50 parts of ε-caprolactam under suitable conditions was reacted with 87 parts of 90% formic acid, 10 parts of paraform and 29.3 parts of diethylaminoethanol in the manner described in Example A.

Treatment of 45 parts of the above reaction mixture with 396 parts of acetone resulted in the separation of a soft gelatinous precipitate. The gelatinous material was washed several times with additional acetone by decantation which caused the precipitate to harden. The addition of 90 parts of water resulted in a clear solution.

*Example E*

A solution of 10 parts of a commercial sample of a poly hexamethylene adipamide (intrinsic viscosity in meta-cresol of 0.96) was prepared in 137 parts of 90% formic acid at 60–65° C. A solution of 10 parts of paraform in 35 parts of triethanolamine was reacted with the nylon-formic acid solution employing the general procedure outlined in Example A. The reaction product was fluid at room temperature. Treatment of a portion of the above-mentioned reaction product with a large volume of acetone resulted in the separation of a fine granular precipitate which was easily soluble in water at 50–60° C.

*Example F*

A solution of 10 parts of a polyamide made from ε-caprolactam (intrinsic viscosity in metal-cresol of 0.91) in 87 parts of 90% formic acid was reacted with 10 parts of paraformaldehyde and 30 parts of methyl diethanolamine employing the general procedure described in Example A. The precipitated product obtained by treating a portion of the reaction mixture with a large volume of acetone was easily soluble in water.

*Example G*

A reaction mixture was prepared from 10 parts of a polyamide made from ε-caprolactam (intrinsic viscosity 0.91), 87 parts of 90% formic acid, 10 parts of paraformaldehyde, and 26 parts of dimethyl isopropanolamine by the general procedure described in Example A. The precipitated product (with acetone) was partially soluble in water at 50–60° C.

*Example H*

Example G was repeated except that the poly-amino caproic acid used had an intrinsic viscosity of 0.79 and 33 parts of hydroxyethyl morpholine instead of the dimethyl isopropanolamine. The precipitated product (with acetone) was easily soluble in water at 50–60° C. with stirring.

*Example I*

Example A was repeated except that 22 parts of dimethyl amino ethanol was used instead of the diethyl aminoethanol. The acetone precipitated derivative was easily soluble in water at 40–50° C. with stirring.

The water soluble salts as produced above are new compounds of value for a number of purposes. They may be characterized as containing recurring groups of the formula:

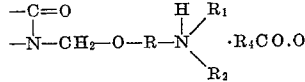

where

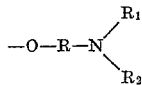

is the residue from the aminoalcohol used in the reaction as specified above, and $R_4CO.O$ is the acid group from the carboxylic acid employed. In general these recurring groups are separated by an average number of carbon atoms of at least 2. The total number of such recurring groups will depend on the proportions of the reactants as exemplified above. The number of recurring groups is also dependent on the anhydrous conditions of the solvent; thus greater substitution is obtained with 100% formic acid than is obtained with 90% formic acid. In general there should be such recurring groups constituting at least 10% of the amide groups in the main polymer chain.

As pointed out above the water soluble salt is recovered without neutralization. Neutralization is therefore avoided. Many of the intermediate disubstituted-N-alkoxy methyl polyamides per se, are new compounds and for this purpose may be described as those in which the substituents on the nitrogen of the amino-alcohol residue are saturated aliphatic radicals of less than six carbon atoms at least one of which is a non-hydroxylated alkyl group.

The water-soluble salts of the present invention may be used for a variety of purposes and water solutions are particularly useful for treating wool to produce shrinkproofing. Solutions as shown in the examples are useful for this purpose.

Or the new compounds of the present invention may be converted into related derivatives and utilized for shrinkproofing wool or for other purposes. Thus polyamide derivatives obtained by reacting N-alkoxy methyl polyamides, such as N-methoxy methyl hexamethylene adipamide, with thiourea, may be produced and employed as herein set forth.

Having thus set forth our invention, we claim:

1. The method of making a water soluble polyamide which comprises heating to reaction temperature as the only essential reactants a formaldehyde yielding substance, a lower fatty acid, an N-dialkyl substituted aminoalcohol capable of neutralizing the fatty acid, and a synthetic linear polyamide of intrinsic viscosity above 0.4 and having hydrogen bearing carbonamide groups as an integral part of the main polymer chain, and adding an amount of an organic liquid capable of precipitating the modified polyamide to precipitate the modified polyamide from the solution in the form of a water-soluble salt.

2. A method as set forth in claim 1 in which each of the substituent groups attached to the N is an alkyl group of less than six carbon atoms.

3. A method as set forth in claim 1 in which the aminoalcohol has the formula $$HO-R-N\begin{matrix}R_1\\R_2\end{matrix}$$

in which R is an alkylene and $R_1$ and $R_2$ are alkyl groups of less than six carbon atoms.

4. A method as set forth in claim 1 in which in the polyamide there are recurring hydrogen bearing carbonamide groups separated by an average number of carbon atoms of at least 2.

5. The method of making a modified polyamide which comprises heating to reaction temperature as the only essential reactants a formaldehyde yielding substance, a lower fatty acid, an N-dialkyl substituted aminoalcohol capable of neutralizing the fatty acid, and a synthetic linear polyamide of intrinsic viscosity above 0.4 and having hydrogen bearing carbonamide groups as an integral part of the main polymer chain.

6. A method as set forth in claim 1 in which the organic liquid is acetone.

7. The method of claim 1 in which the polyamide is poly-ε-amino caproic acid, the amino alcohol is diethylaminoethanol and the fatty acid is formic acid.

8. The method of claim 1 in which the polyamide is polyhexamethylene adipamide, the amino alcohol is diethylaminoethanol and the fatty acid is formic acid.

9. The method of claim 1 in which the polyamide is a copolymer of ethylene diammonium sebacate and ε-caprolactam, the amino alcohol is diethylaminoethanol, and the fatty acid is formic acid.

10. The method of claim 1 in which the polyamide is ε-caprolactam, the amino alcohol is dimethylisopropanolamine, and the fatty acid is formic acid.

11. The method of claim 1 in which the polyamide is ε-caprolactam, the amino alcohol is hydroxyethylmorpholine, and the fatty acid is formic acid.

References Cited in the file of this patent

UNITED STATES PATENTS

| | | |
|---|---|---|
| 2,169,366 | Meigs | Aug. 15, 1939 |
| 2,430,860 | Cairns | Nov. 18, 1947 |
| 2,443,450 | Graham et al. | June 15, 1948 |
| 2,456,271 | Graham | Dec. 14, 1948 |

OTHER REFERENCES

Karrer: Organic Chemistry, Elsevier 1938, pages 274, 739, 773.